(12) United States Patent
Wang et al.

(10) Patent No.: US 10,702,009 B2
(45) Date of Patent: Jul. 7, 2020

(54) PUNCTURE RESISTANT INSOLE OR FOOTWEAR

(71) Applicant: Milliken & Company, Spartanburg, SC (US)

(72) Inventors: Yunzhang Wang, Duncan, SC (US); Thomas E. Mabe, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 787 days.

(21) Appl. No.: 15/139,633

(22) PCT Filed: Jul. 16, 2014

(86) PCT No.: PCT/US2014/046808
§ 371 (c)(1),
(2) Date: Apr. 27, 2016

(87) PCT Pub. No.: WO2015/065545
PCT Pub. Date: May 7, 2015

(65) Prior Publication Data
US 2016/0295956 A1 Oct. 13, 2016

Related U.S. Application Data

(60) Provisional application No. 61/899,530, filed on Nov. 4, 2013.

(51) Int. Cl.
*A43B 7/32* (2006.01)
*A43B 13/02* (2006.01)
(Continued)

(52) U.S. Cl.
CPC .............. *A43B 7/32* (2013.01); *A43B 13/026* (2013.01); *A43B 13/386* (2013.01);
(Continued)

(58) Field of Classification Search
CPC ....... A43B 7/32; A43B 13/026; A43B 13/386; A43B 17/006; A43B 17/02
(Continued)

(56) References Cited

U.S. PATENT DOCUMENTS 5,036,603 A * 8/1991 Dischler ................. A43B 17/00
36/43
6,133,169 A * 10/2000 Chiou ................ A41D 31/0061
428/911

(Continued)

FOREIGN PATENT DOCUMENTS

DE 202005021306 U1 * 8/2007 ............... A43B 7/32
DE 20 2005 021306 9/2007
(Continued)

OTHER PUBLICATIONS

DE 202005021306 U1 Haesnel—Oct. 24, 2005 Espacenet Translation from German to English.*
(Continued)

*Primary Examiner* — Alissa L Hoey
*Assistant Examiner* — Catherine M Ferreira
(74) *Attorney, Agent, or Firm* — Cheryl J. Brickey

(57) ABSTRACT

An insole with puncture-resistant properties for safety footwear. The insole contains a repeating pattern of knit layer groupings and woven layer groupings where the knit layer groupings form the upper and lower surfaces of the insole. Each layer within the knit layer groupings and the woven layer groupings is adhesively bonded to the adjacent layers. The knit layer groupings contain at least two knit layers and the woven layer groupings contain at least two woven layers. Each woven and knit layer contains yarns or fibers having a tenacity of about 5 or more grams per denier in a knit configuration. Each woven and knit layer is impregnated on both sides and at least some of the internal surfaces with (Continued)

about 10 wt. % or less, based on the total weight of the layer, of a coating containing a plurality of particles having a diameter of about 20 µm or less.

8 Claims, 4 Drawing Sheets

(51) Int. Cl.
| | |
|---|---|
| *A43B 17/00* | (2006.01) |
| *A43B 13/38* | (2006.01) |
| *B32B 5/26* | (2006.01) |
| *B32B 5/02* | (2006.01) |
| *B32B 7/12* | (2006.01) |
| *A43B 17/02* | (2006.01) |

(52) U.S. Cl.
CPC ............ *A43B 17/006* (2013.01); *A43B 17/02* (2013.01); *B32B 5/024* (2013.01); *B32B 5/026* (2013.01); *B32B 5/26* (2013.01); *B32B 7/12* (2013.01); *B32B 2250/20* (2013.01); *B32B 2260/021* (2013.01); *B32B 2260/023* (2013.01); *B32B 2262/0269* (2013.01); *B32B 2264/102* (2013.01); *B32B 2307/5825* (2013.01); *B32B 2307/73* (2013.01); *B32B 2437/02* (2013.01)

(58) Field of Classification Search
USPC ..................................................... 36/44, 144
See application file for complete search history.

(56) References Cited

U.S. PATENT DOCUMENTS

| | | | |
|---|---|---|---|
| 8,236,711 B1* | 8/2012 | Wang | .................... F41H 5/0485 428/102 |
| 2012/0183720 A1* | 7/2012 | Wang | .................... F41H 5/0485 428/68 |
| 2016/0295956 A1* | 10/2016 | Wang | ....................... A43B 7/32 |

FOREIGN PATENT DOCUMENTS

| | | |
|---|---|---|
| WO | WO 2007/148365 | 12/2007 |
| WO | WO 2010/083594 | 7/2010 |

OTHER PUBLICATIONS

Patent Cooperation Treaty PCT International Search Report, dated Nov. 11, 2014, International Application No. PCT/US2014/046808, International Filing Date, Jul. 16, 2014.

\* cited by examiner

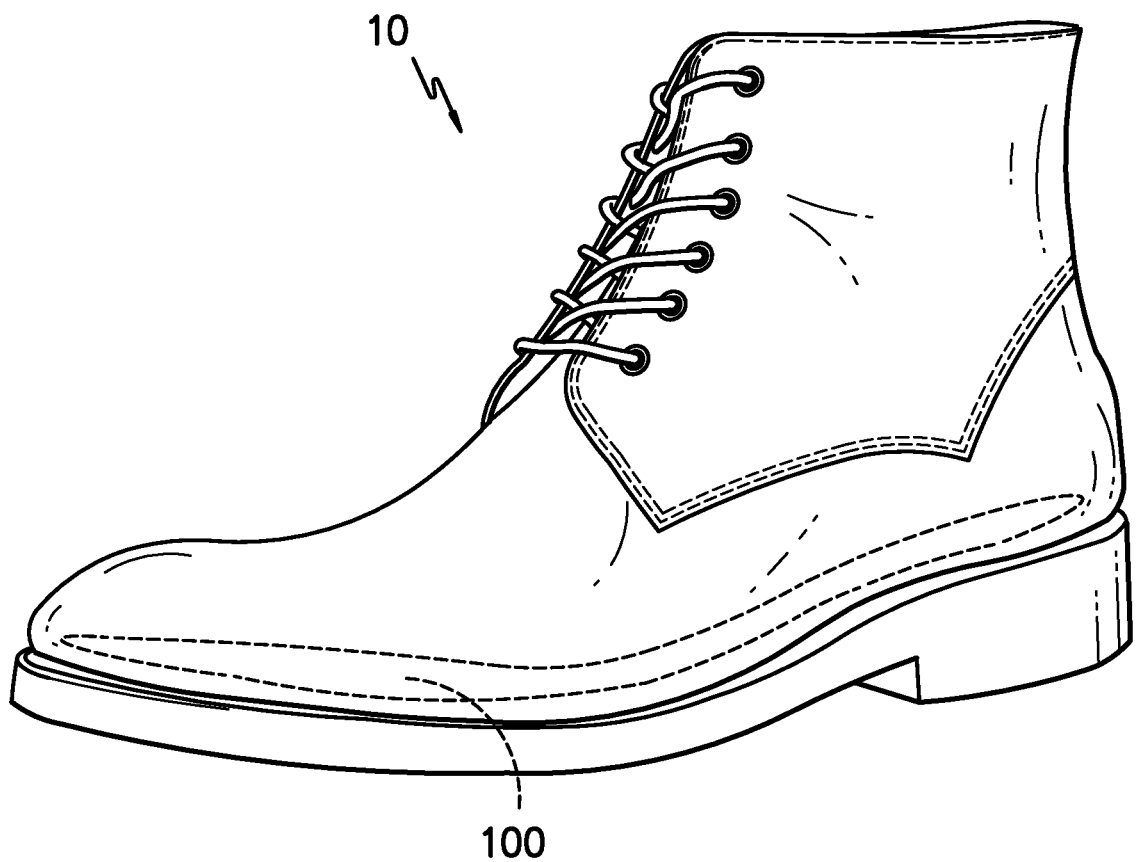
FIG. -1-

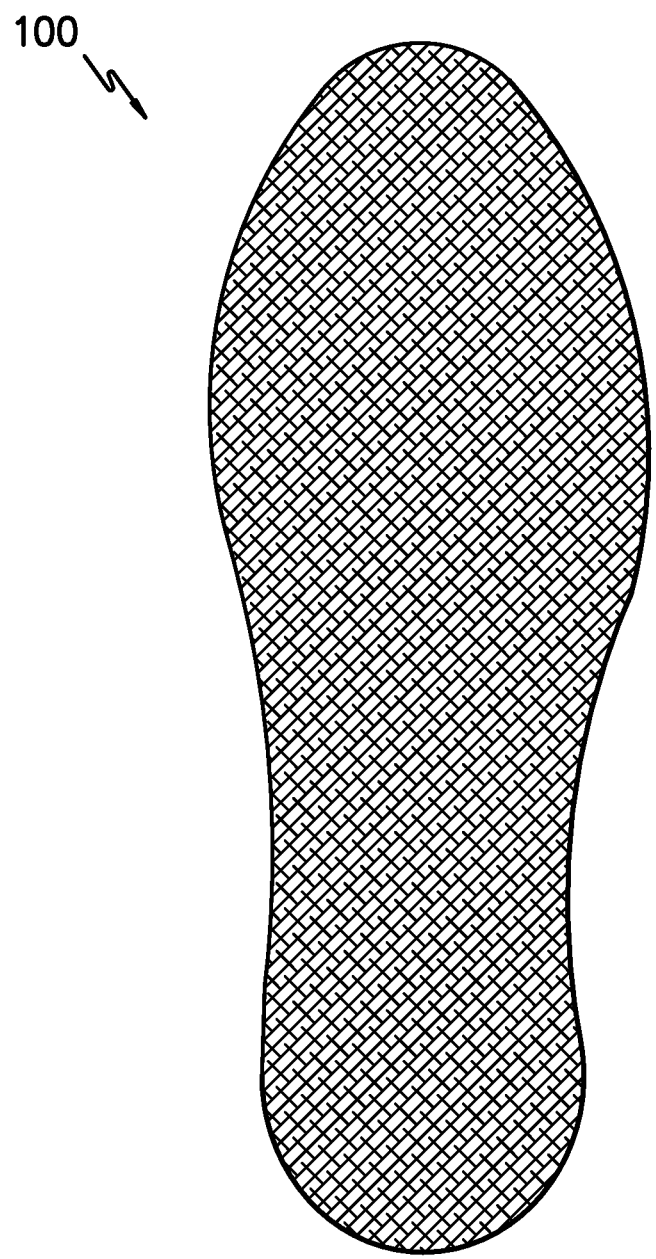
FIG. -2-

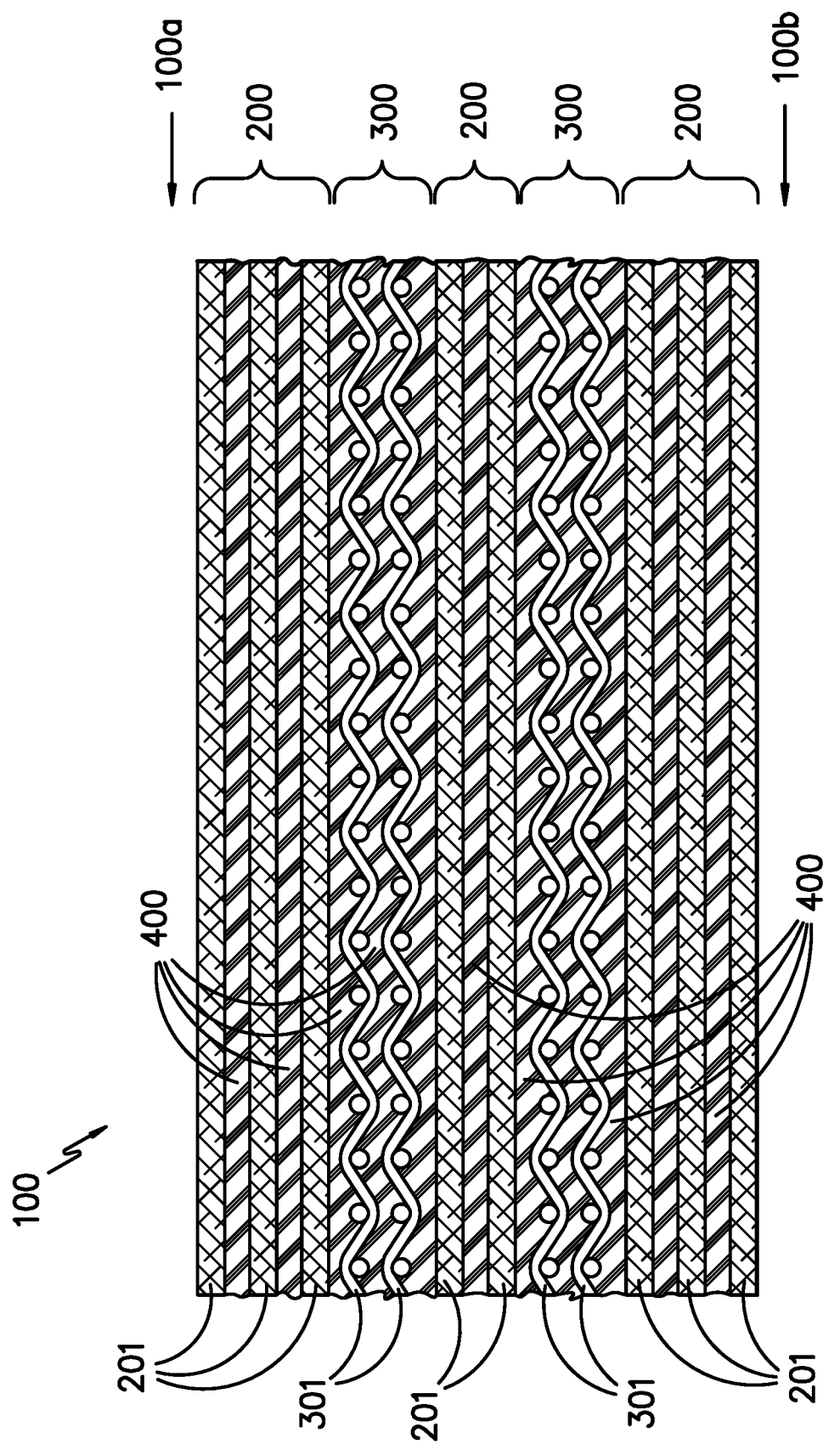
FIG. -3-

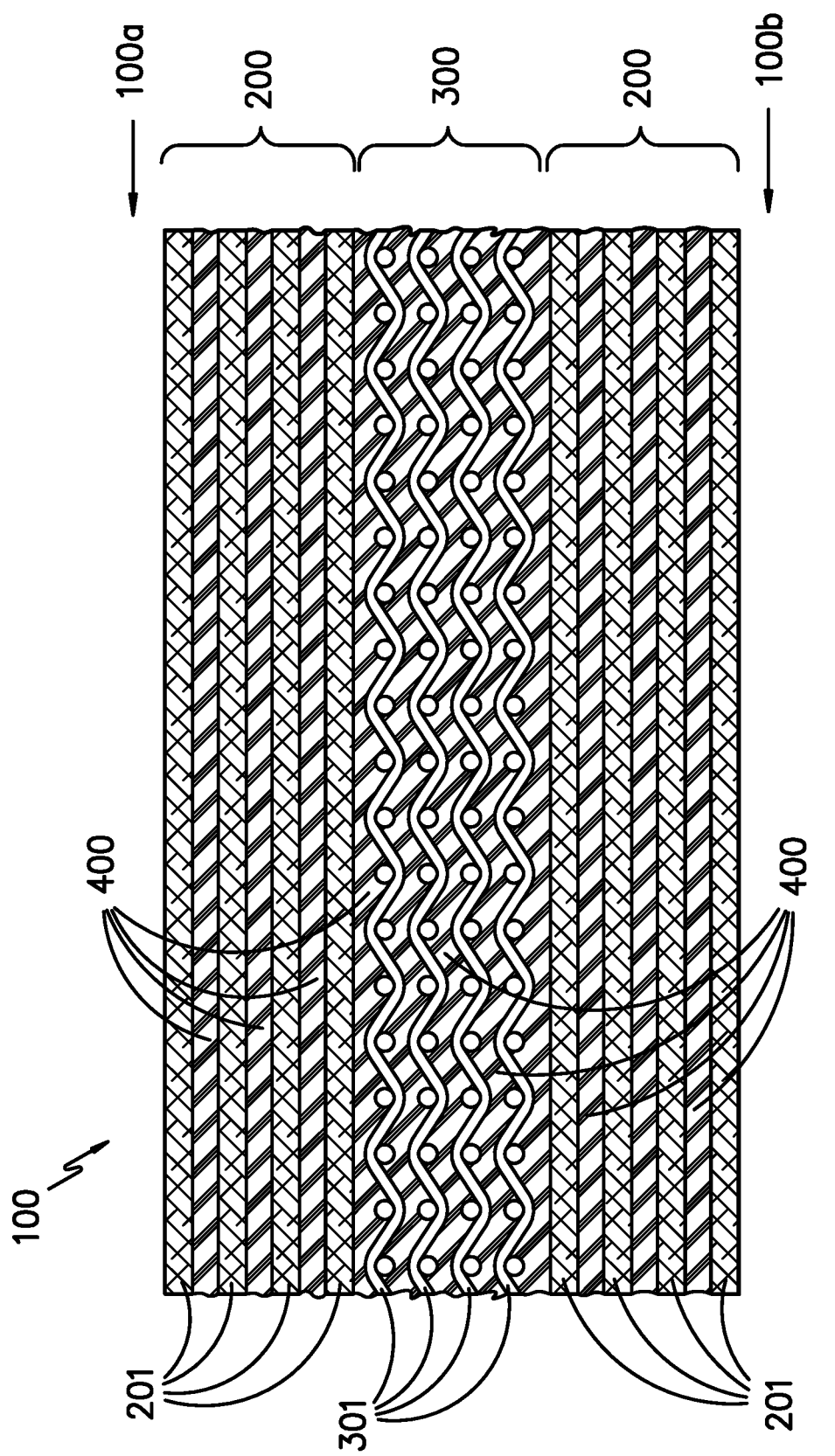
FIG. -4-

PUNCTURE RESISTANT INSOLE OR FOOTWEAR

RELATED APPLICATIONS

This application is a nationalization (371) of PCT application PCT/2014/046808 which claims priority to U.S. provisional patent application 61/899,530, all of which are incorporated herein in their entirety.

FIELD OF THE INVENTION

The present application is directed to flexible puncture resistant materials exhibiting puncture resistant properties for use in footwear.

BACKGROUND

In some professions and environments there is a risk of penetration of sharp objects (for example nails) through the sole of footwear injuring the wearer. There is a need for flexible puncture resistant footwear and insoles for footwear.

BRIEF SUMMARY OF THE INVENTION

The invention provides an insole with puncture resistant properties for safety footwear. The insole contains a repeating pattern of knit layer groupings and woven layer groupings where the knit layer groupings form the upper and lower surfaces of the insole. Each layer within the knit layer groupings and the woven layer groupings is adhesively bonded to the adjacent layers. The knit layer groupings contain at least two knit layers and the woven layer groupings contain at least two woven layers. Each woven and knit layer contains yarns or fibers having a tenacity of about 5 or more grams per denier in a knit configuration. Each woven and knit layer is impregnated on both sides and at least some of the internal surfaces with about 10 wt. % or less, based on the total weight of the layer, of a coating containing a plurality of particles having a diameter of about 20 μm or less.

A safety footwear article containing the insole with puncture resistant properties is also disclosed.

BRIEF DESCRIPTION OF THE DRAWINGS

FIG. 1 is an illustration of a shoe having a puncture-resistant insole.

FIG. 2 is an illustration of a puncture resistant insole.

FIGS. 3-4 are schematic cross-sections of different embodiments of the puncture-resistant insole.

DETAILED DESCRIPTION OF THE INVENTION

The invention is directed to puncture resistant insoles and safety footwear having puncture resistant insoles. As utilized herein, the term "puncture resistant" is generally used to refer to a material that provides protection against penetration of the material by sharp-pointed weapons or objects, such as an ice pick (sometimes referred to as spike objects) and/or edged blades such as knives and other knife-like weapons or objects (sometimes referred to as knife objects). Thus, a "puncture resistant" material can either prevent penetration of the material by such an object or can lessen the degree of penetration of such an object as compared to similar, non-puncture resistant materials.

Preferably, a "puncture resistant" material designed for footwear achieves a pass rating when tested according to ASTM F2412-05 (section 11 puncture resistant footwear). The pass fail criteria were set to be 270 lbs force. The insole 100 is preferably flexible. "Flexible" in this application means able to bend to an angle of 15 degrees by the average force exerted by a user's foot. Preferably, the composite has a bending modulus of less than about 100 ksi, more preferably less than about 50 ksi, more preferably less than about 40 ksi.

Referring now to FIG. 1, there is shown a shoe 10 containing the puncture resistant insole 100. While FIG. 1 shows a shoe 10, any suitable type of footwear may be used, including but not limited to sneakers, pumps, boots, sandals, flip flops, slippers, active wear, military issue boots, hiking boots, and steel toed shoes. FIG. 2 illustrates a puncture resistant insole 100. The insole 100 may be manufactured into the shoe 10 such that is removable or non-removable or may be added a separate component to an existing shoe 10. Preferably, the insole 100 comes in a variety of sizes to fit a type and size of shoe 10. While the puncture resistant article is shown as an insole, additional components of the footwear article may also have puncture resistance such as the tongue, sides of the ankle, back of the heel area, and/or upper toe area. The material forming the insole may also be used for any other suitable end product that requires flexibility and puncture resistance.

Referring now to FIG. 3, there is shown one schematic cross-section of an embodiment of the puncture resistant insole 100. The puncture resistant insole 100 has an upper side 100a and a lower side 100b. The puncture resistant insole 100 may be symmetric such that the performance is the same no matter which surface is facing the user, or may have directionality.

The puncture resistant insole 100 has an upper surface 100a and a lower surface 100b. The puncture resistant insole 100 contains a repeating pattern knit layer groupings 200 and woven layer groupings 300 with adhesive between and adhesively bonding each of the layers 201, 301. The knit layer grouping 200 contains knit layers 201 and the woven layer groupings 300 contain woven layers 301. Preferably, the groupings 200, 300 are arranged such that the knit layer groupings 200 form the upper and lower surfaces 100a, 100b of the insole 100.

The knit layer groupings preferably form the outer surfaces of the insole for added flexibility. It was found that when woven layer groupings formed the outer surfaces 100a, 100b of the insole 100, that the flexibility was lower. Additionally, the knit layers may contain yarns such as polyester or nylon which have better abrasion resistance than some yarns typically used in the woven layers such as aramids.

The knit layer groupings 200 each contain at least one knit layer 201. In another embodiment, the knit layer groupings 200 each contain at least two knit layers 201. In one embodiment, the knit layer groupings 200 each contain 3 knit layers 201. In another embodiment, the knit layer groupings 200 each contain 4 knit layers 201. In another embodiment, the knit layer groupings 200 each contain more than 4 knit layers 201. In another embodiment, the number of knit layers 201 in each knit layer grouping 200 may vary throughout the insole.

Any suitable knit construction may be used for the knit layers 201, and each knit layer does not have to have the same knit construction (or yarns, or coatings). In one embodiment, the knit layers 201 are in a warp knit construction. In another embodiment, the knit layers 201 are in a Rashel knit.

The woven layer groupings preferably do not form the outer surfaces of the insole. The woven layer 301 have been proven very effective for puncture resistance but typically is less flexible than a knit layer.

The woven layer groupings 300 each contain at least one woven layer 301. In another embodiment, the woven layer groupings 300 each contain at least two woven layers 301. In one embodiment, the woven layer groupings 300 each contain 3 knit layers 301. In another embodiment, the woven layer groupings 300 each contain 4 knit layers 301. In another embodiment, the woven layer groupings 300 each contain more than 4 knit layers 301. In another embodiment, the number of woven layers 301 in each woven layer grouping 300 may vary throughout the insole.

Any suitable woven construction may be used for the woven layers 301, and each woven layer does not have to have the same woven construction (or yarns, or coatings). In one embodiment, the woven layers 301 are in a plain weave, basket weave, leno weave or other woven construction. The woven layers 301 preferably include a multiplicity of warp and weft elements interwoven together such that a given weft element extends in a predefined crossing pattern above and below the warp element. In the illustrated arrangement, the warp and weft elements are formed into a so called plain weave wherein each weft element passes over a warp element and thereafter passes under the adjacent warp element in a repeating manner across the full width of the textile layer 130.

In one embodiment, the woven layers 301 in the woven layer grouping(s) have a tightness of between greater than about 0.75 as defined in U.S. Pat. No. 6,133,169 (Chiou) and U.S. Pat. No. 6,103,646 (Chiou), which are incorporated herein by reference. "Fabric tightness factor" and "Cover factor" are names given to the density of the weave of a fabric. Cover factor is a calculated value relating to the geometry of the weave and indicating the percentage of the gross surface area of a fabric that is covered by yarns of the fabric. The equation used to calculate cover factor is as follows (from Weaving: Conversion of Yarns to Fabric, Lord and Mohamed, published by Merrow (1982), pages 141-143):

$d_w$=width of warp yarn in the fabric
$d_f$=width of fill yarn in the fabric
$p_w$=pitch of warp yarns (ends per unit length)
$p_f$=pitch of fill yarns $$C_w = \frac{d_w}{p_w} C_f = \frac{d_f}{p_f}$$

$$\text{Fabric\_Cover\_Factor} = Cfab = \frac{\text{total\_area\_obsured}}{\text{area\_enclosed}}$$

$$C_{fab} = \frac{(p_w - d_w)d_f + d_w p_f}{p_w p_f}$$

$$C_{fab} = (C_f + C_w - C_f C_w)$$

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor.

$$\text{Fabric\_tightness\_factor} = \frac{\text{actual\_cover\_factor}}{\text{maximum\_cover\_factor}}$$

For example, the maximum cover factor that is possible for a plain weave fabric is 0.75; and a plain weave fabric with an actual cover factor of 0.68 will, therefore, have a fabric tightness factor of 0.91. The preferred weave for practice of this invention is plain weave.

The yarns or fibers that form the knit layers 201 and the woven layers 301 can comprise any suitable fibers. Yarns or fibers 111 suitable for use generally include, but are not limited to, high tenacity and high modulus yarns or fibers, which refers to yarns that exhibit a relatively high ratio of stress to strain when placed under tension. In order to provide adequate protection, the yarns or fibers typically have a tenacity of about 5 or more grams per denier. In certain possibly preferred embodiments, the yarns or fibers can have a tenacity of about 8 or more grams per denier, more preferably 10 or more grams per denier, more preferably 15 or more grams per denier.

Fibers or yarns 111 suitable for use in the knit layers 201 and the woven layers 301 include, but are not limited to, fibers made from highly oriented polymers, such as gel-spun ultrahigh molecular weight polyethylene fibers (e.g., SPECTRA® fibers from Honeywell Advanced Fibers of Morristown, N.J. and DYNEEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), and sintered polyethylene fibers (e.g., TENSYLON® fibers from ITS of Charlotte, N.C.). Suitable fibers also include those made from rigid-rod polymers, such as lyotropic rigid-rod polymers, heterocyclic rigid-rod polymers, and thermotropic liquid-crystalline polymers. Suitable fibers made from lyotropic rigid-rod polymers include aramid fibers, such as poly(p-phenyleneterephthalamide) fibers (e.g., KEVLAR® fibers from DuPont of Wilmington, Del. and TWARON® fibers from Teijin of Japan) and fibers made from a 1:1 copolyterephthalamide of 3,4'-diaminodiphenylether and p-phenylenediamine (e.g., TECHNORA® fibers from Teijin of Japan). Suitable fibers made from heterocyclic rigid-rod polymers, such as p-phenylene heterocyclics, include poly(p-phenylene-2,6-benzobisoxazole) fibers (PBO fibers) (e.g., ZYLON® fibers from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxy)phenylene] fibers (PIPD fibers) (e.g., M5® fibers from DuPont of Wilmington, Del.). Suitable fibers made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable fibers also include carbon fibers, such as those made from the high temperature pyrolysis of rayon, polyacrylonitrile (e.g., OPF® fibers from Dow of Midland, Mich.), and mesomorphic hydrocarbon tar (e.g., THORNEL® fibers from Cytec of Greenville, S.C.). In certain possibly preferred embodiments, the yarns or fibers comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2- napthoic acid-co-4-hydroxybenzoic acid) fibers, carbon fibers, and combinations thereof.

In one embodiment the knit layers 201 contain a polyester yarn. Polyester many be preferred in some embodiments for its lower cost. In another embodiment, the woven layers 301 contain KELVAR® yarns which are preferred for their high tenacity.

In one embodiment, the woven layers 301 contain a coating on at least a surface thereof. In one embodiment, the knit layers 201 contain a coating on at least a surface thereof. In a preferred embodiment, both the woven layers 301 and the knit layers 201 (all of the fabric layers in the insole 100) contain a coating on at least a surface thereof. In certain possibly preferred embodiments, the coating can penetrate into the interior portion of the layers 201, 301 to at least partially coat the yarns or fibers.

The coating applied to the woven and/or knit layers 201, 301 comprise particulate matter (e.g., a plurality of particles). The particles included in the coating can be any suitable particles, but preferably are particles having a diameter of about 20 μm or less, or about 10 μm or less, or about 1 μm or less (e.g., about 500 nm or less or about 300 nm or less). Particles suitable for use in the coating include, but are not limited to, silica particles, (e.g., fumed silica particles, precipitated silica particles, alumina-modified colloidal silica particles, etc.), alumina particles (e.g. fumed alumina particles), and combinations thereof. In certain possibly preferred embodiments, the particles are comprised of at least one material selected from the group consisting of fumed silica, precipitated silica, fumed alumina, alumina modified silica, zirconia, titania, silicon carbide, titanium carbide, tungsten carbide, titanium nitride, silicon nitride, and the like, and combinations thereof. Such particles can also be surface modified, for instance by grafting, to change surface properties such as charge and hydrophobicity. Suitable commercially available particles include, but are not limited to, the following: CAB-O-SPERSE® PG003 fumed alumina, which is a 40% by weight solids aqueous dispersion of fumed alumina available commercially from Cabot Corporation of Boyertown, Pa. (the dispersion has a pH of 4.2 and a median average aggregate particle size of about 150 nm); SPECTRAL™ 51 fumed alumina, which is a fumed alumina powder available commercially from Cabot Corporation of Boyertown, Pa. (the powder has a BET surface area of 55 m$^2$/g and a median average aggregate particle size of about 150 nm); CAB-O-SPERSE® PG008 fumed alumina, which is a 40% by weight solids aqueous dispersion of fumed alumina available commercially from Cabot Corporation of Boyertown, Pa. (the dispersion has a pH of 4.2 and a median average aggregate particle size of about 130 nm); SPECTRAL™ 81 fumed alumina, which is a fumed alumina powder available commercially from Cabot Corporation of Boyertown, Pa. (the powder has a BET surface area of 80 m$^2$/g and a median average aggregate particle size of about 130 nm); AEROXIDE ALU C fumed alumina, which is a fumed alumina powder available commercially from Degussa, Germany (the powder has a BET surface area of 100 m$^2$/g and a median average primary particle size of about 13 nm); LUDOX® CL-P colloidal alumina coated silica, which is a 40% by weight solids aqueous sol available from Grace Davison (the sol has a pH of 4 and an average particle size of 22 nm in diameter); NALCO® 1056 aluminized silica, which is a 30% by weight solids aqueous colloidal suspension of aluminized silica particles (26% silica and 4% alumina) available commercially from Nalco; LUDOX® TMA colloidal silica, which is a 34% by weight solids aqueous colloidal silica sol available from Grace Davison. (the sol has a pH of 4.7 and an average particle size of 22 nm in diameter); NALCO® 88SN-126 colloidal titanium dioxide, which is a 10% by weight solids aqueous dispersion of titanium dioxide available commercially from Nalco; CAB-O-SPERSE® S3295 fumed silica, which is a 15% by weight solids aqueous dispersion of fumed silica available commercially from Cabot Corporation of Boyertown, Pa. (the dispersion has a pH of 9.5 and an average agglomerated primary particle size of about 100 nm in diameter); CAB-O-SPERSE® 2012A fumed silica, which is a 12% by weight solids aqueous dispersion of fumed silica available commercially from Cabot Corporation of Boyertown, Pa. (the dispersion has a pH of 5); CAB-O-SPERSE® PG001 fumed silica, which is a 30% by weight solids aqueous dispersion of fumed silica available commercially from Cabot Corporation of Boyertown, Pa. (the dispersion has a pH of 10.2 and a median aggregate particle size of about 180 nm in diameter); CAB-O-SPERSE® PG002 fumed silica, which is a 20% by weight solids aqueous dispersion of fumed silica available commercially from Cabot Corporation of Boyertown, Pa. (the dispersion has a pH of 9.2 and a median aggregate particle size of about 150 nm in diameter); CAB-O-SPERSE® PG022 fumed silica, which is a 20% by weight solids aqueous dispersion of fumed silica available commercially from Cabot Corporation of Boyertown, Pa. (the dispersion has a pH of 3.8 and a median aggregate particle size of about 150 nm in diameter); SIPERNAT® 22LS precipitated silica, which is a precipitated silica powder available from Degussa of Germany (the powder has a BET surface area of 175 m$^2$/g and a median average primary particle size of about 3 μm); SIPERNAT® 500LS precipitated silica, which is a precipitated silica powder available from Degussa of Germany (the powder has a BET surface area of 450 m$^2$/g and a median average primary particle size of about 4.5 μm); and VP Zirconium Oxide fumed zirconia, which is a fumed zirconia powder available from Degussa of Germany (the powder has a BET surface area of 60 m$^2$/g).

In certain possibly preferred embodiments, the particles can have a positive surface charge when suspended in an aqueous medium, such as an aqueous medium having a pH of about 4 to 8. Particles suitable for use in this embodiment include, but are not limited to, alumina-modified colloidal silica particles, alumina particles (e.g. fumed alumina particles), and combinations thereof. In certain possibly preferred embodiments, the particles can have a Mohs' hardness of about 5 or more, or about 6 or more, or about 7 or more. Particles suitable for use in this embodiment include, but are not limited to, fumed alumina particles. In certain possibly preferred embodiments, the particles can have a three-dimensional branched or chain-like structure comprising or consisting of aggregates of primary particles. Particles suitable for use in this embodiment include, but are not limited to, fumed alumina particles, fumed silica particles, and combinations thereof.

The particles included in the coating can be modified to impart or increase the hydrophobicity of the particles. For example, in those embodiments comprising fumed silica particles, the fumed silica particles can be treated, for example, with an organosilane in order to render the fumed silica particles hydrophobic. Suitable commercially-available hydrophobic particles include, but are not limited to, the R-series of AEROSIL® fumed silicas available from Degussa, such as AEROSIL® R812, AEROSIL® R816, AEROSIL® R972, and AEROSIL® R7200. While not wishing to be bound to any particular theory, it is believed that using hydrophobic particles in the coating will minimize the amount of water that the layers will absorb when exposed to a wet environment. When hydrophobic particles are utilized in the coating on the textile layer(s) 110, the hydrophobic particles can be applied using a solvent-containing coating composition in order to assist their application. Such particles and coatings are believed to be more fully described in U.S. Patent Publication No. 2007/0105471 (Wang et al.), incorporated herein by reference.

The woven layers 301 and/or the knit layers 201 can comprise any suitable amount of the coating. As will be understood by those of ordinary skill in the art, the amount of coating applied to the woven layers 301 and/or the knit layers 201 generally should not be so high that the weight of the insole 100 is dramatically increased, which could potentially impair certain end uses for the insole 100. Typically, the amount of coating applied to the woven layers 301 and/or the knit layers 201 will comprise about 10 wt. % or less of the total weight of the woven layers 301 and/or the knit layers 201. In certain possibly preferred embodiments, the amount of coating applied to the woven layers 301 and/or the knit layers 201 will comprise about 5 wt. % or less or about 3 wt. % or less (e.g., about 2 wt. % or less) of the total weight of the woven layers 301 and/or the knit layers 201. Typically, the amount of coating applied to the woven layers 301 and/or the knit layers 201 will comprise about 0.1 wt. % or more (e.g., about 0.5 wt. % or more) of the total weight of the woven layers 301 and/or the knit layers 201. In certain possibly preferred embodiments, the coating comprises about 2 to about 4 wt. % of the total weight of the woven layers 301 and/or the knit layers 201.

In certain possibly preferred embodiments of the insole 10, the coating applied to the woven layers 301 and/or the knit layers 201 can further comprise a binder. The binder included in the coating can be any suitable binder. Suitable binders include, but are not limited to, isocyanate binders (e.g., blocked isocyanate binders), acrylic binders (e.g, non-ionic acrylic binders), polyurethane binders (e.g., aliphatic polyurethane binders and polyether based polyurethane binders), epoxy binders, and combinations thereof. In certain possibly preferred embodiments, the binder is a cross-linking binder, such as a blocked isocyanate binder.

When present, the binder can comprise any suitable amount of the coating applied to the woven layers 301 and/or the knit layers 201. The ratio of the amount (e.g., weight) of particles present in the coating to the amount (e.g., weight) of binder solids present in the coating typically is greater than about 1:1 (weight particles:weight binder solids). In certain possibly preferred embodiments, the ratio of the amount (e.g., weight) of particles present in the coating to the amount (e.g., weight) of binder solids present in the coating typically is greater than about 2:1, or greater than about 3:1, or greater than about 4:1, or greater than about 5:1 (e.g., greater than about 6:1, greater than about 7:1, or greater than about 8:1). It is noted that when the coating is applied to the woven layers 301, the woven layer 301 can have a much lower fabric tightness fabric to achieve the same level of penetration resistance.

In certain possibly preferred embodiments, the coating applied to the woven layers 301 and/or the knit layers 201 can comprise a water-repellant in order to impart greater water repellency to the insole 100. The water-repellant included in the coating can be any suitable water-repellant including, but not limited to, fluorochemicals or fluoropolymers.

Referring back to FIG. 3, there is shown an adhesive layer 400 between each of the layers in contacting relationship with woven layers 301 and the knit layers 201. The adhesive layer 400 may melt, conform, penetrate the other layers, or otherwise change shape during the application of the adhesive and consolidation of the woven layers 301 and the knit layers 201, but is shown as a distinct layer for ease of viewing in the Figures. The adhesive layer 400 adheres the textile layers (woven to woven, knit to knit, and woven to knit) together during consolidation. The adhesive layer 400 preferably comprises a material which is compatible with the adjacent layers 201, 301 and fuses the layers 201, 301 into the insole 100. The adhesive may be activated to fuse together the layers 201, 301 by pressure, heat, UV, other activation methods, or any combination thereof. In one embodiment, the adhesive layer 400 is a pressure sensitive adhesive. In another embodiment, the adhesive layer 400 is a hot melt adhesive. Preferably, the adhesive layer 400 is located substantially between the layers and is not found in a significant amount on the upper and lower surfaces 100a, 100b of the insole 100.

The adhesive layer 400 may be formed by any method known in the art. Preferred methods include any well known coating method such as air knife coating, gravure coating, hopper coating, roller coating, spray coating, gravure printing, inkjet printing, thermal transfer, and the like. The adhesive layer 400 may be a continuous or discontinuous layer, having a pattern or being random. The coating composition can be based on water or organic solvent(s) or a mixture of water and organic solvent(s). Alternatively, the adhesive layer 400 can be formed by thermal processing such as extrusion and co-extrusion with and without stretching, blow molding, injection molding, lamination, etc. The adhesive layer 400 may also be an adhesive film, web, scrim, powder coating, or the like.

FIG. 3 shows a cross-section of one embodiment of the insole. As one can see from the Figure, there were five layer groupings, in order: a knit layer grouping containing 3 knit layers, a woven layer grouping containing 2 woven layers, a knit layer grouping containing 2 knit layers, a woven layer grouping containing 2 woven layers, and a knit layer grouping containing 3 knit layers. The knit layer groups formed the upper and lower surfaces of the stack. An adhesive layer was located between each adjacent fabric layer. The woven layers and the knit layers may be coated with the particle coating (not shown). The listing of layers, in order, is as follows:

K-A-K-A-K-A-W-A-W-A-K-A-K-A-W-A-W-A-K-A-K-A-K

FIG. 4 shows a cross-section of another embodiment of the insole. As one can see from the Figure, there were three layer groupings, in order: a knit layer grouping containing 4 knit layers, a woven layer grouping containing 4 woven layers, and a knit layer grouping containing 4 knit layers. The knit layer groups formed the upper and lower surfaces of the stack. An adhesive layer was located between each adjacent fabric layer. The woven layers and the knit layers may be coated with the particle coating (not shown). The listing of layers, in order, is as follows:

K-A-K-A-K-A-K-A-W-A-W-A-W-A-W-A-K-A-K-A-K-A-K

While FIGS. 3 and 4 illustrate two embodiments of the invention, any suitable number of knit layer groupings 200 and woven layer groupings 300, as well as any suitable number of layers 201, 301, within the groupings 200, 300 may be used, depending on the desired end use properties.

Each layer grouping preferably contains two layers as having inter-layer interactions between the two layers increases the efficiency of the composite. Preferably, the groupings are symmetric in the composite, it has been found that this produces good results and then there is not a right side and wrong side during installation.

The composite contains both knit layer groupings and woven layer groupings as it was found that these composites out performed all knit and all woven constructions. For example, an all woven composite had poor flexibility and did not have the same level of puncture resistance as composites having both knit and woven layer groupings.

Additional layers may be added to the insole 100 to add additional spike and knife resistance. Examples of suitable known puncture resistant materials or components include, but are not limited to, mail (e.g., chain mail), metal plating, ceramic plating, layers of textile materials made from high tenacity yarns which layers have been impregnated or laminated with an adhesive or resin, or textile materials made from low denier high tenacity yarns in a tight woven form such as DuPont KEVLAR CORRECTIONAL® available from DuPont. Such spike and knife resistant materials or components can be attached to adjacent textiles layer using any suitable means, such as an adhesive, stitches, or other suitable mechanical fasteners, or the material or component and textile layers can be disposed adjacent to each other and held in place relative to each other by a suitable enclosure, such as an envelope.

The insole 100 (and shoe 10) with consolidated layers (meaning that all of the layers are adhered to one another through the adhesive layers 400) may be produced by any suitable method or process. The layer groupings 20, 300 may be formed and consolidated and then consolidated with other layer groupings or all of the layers 200, 300, 400 may be stacked together and consolidated at the same time.

The process to form the coated knit or woven layers 201, 301 comprising a plurality of interwoven yarns or fibers having a tenacity of about 8 or more grams per denier, wherein at least one of the surfaces of the layers 201, 301 comprises about 10 wt. % or less, based on the total weight of the textile layer, of a coating comprising a plurality of particles having a diameter of about 20 μm or less comprises the steps of (a) providing the textile layer, (b) contacting at least one of the lower surface of the first textile layer with a coating composition comprising a plurality of particles having a diameter of about 20 μm or less, and (c) drying the textile layer treated in step (b) to produce a coating on the lower surface of the first textile layer or the upper surface of the second textile layer.

The surface(s) of the layer(s) 201, 301 can be contacted with the coating composition in any suitable manner. The layers 201, 301 can be contacted with the coating composition using conventional padding, spraying (wet or dry), foaming, printing, coating, and exhaustion techniques. For example, the layer(s) 201, 301 can be contacted with the coating composition using a padding technique in which the textile layer is immersed in the coating composition and then passed through a pair of nip rollers to remove any excess liquid. In such an embodiment, the nip rollers can be set at any suitable pressure, for example, at a pressure of about 280 kPa (40 psi). Alternatively, the surface of the layer 201, 301 to be coated can be first coated with a suitable adhesive, and then the particles can be applied to the adhesive.

The coated layers 201, 301 can be dried using any suitable technique at any suitable temperature. For example, the layers 201, 301 can be dried on a conventional tenter frame or range at a temperature of about 160° C. (320° F.) for approximately five minutes. The formed layers 201, 301 comprise about 10 wt. % or less, based on the total weight of the layer, of a coating comprising a plurality of particles having a diameter of about 20 μm or less may be found in US Patent Publication 2007/0105471 (Wang et al.), incorporated herein by reference.

Consolidation of knit and woven layers 201, 301 and the adhesive layers 400 is preferably carried out at suitable temperature and pressure conditions to facilitate both interface bonding fusion and partial migration of the melted adhesive layer 400 between the knit and woven layers 201, 301. Heated batch or platen presses may be used for multilayer consolidation. However, it is contemplated that any other suitable press may likewise be used to provide appropriate combinations of temperature and pressure. According to a potentially preferred practice, heating is carried out at a temperature of about 130-160° C. and a pressure of about 0.5-70 bar. According to a potentially preferred practice, cooling is carried out under pressure to a temperature less than about 115° C. It is contemplated that maintaining pressure during the cooling step tends to inhibit shrinkage. Without wishing to be limited to a specific theory, it is believed that higher pressures may facilitate polymer flow at lower temperatures. Thus, at the higher end of the pressure range, (greater than about 20 bar) the processing temperature may be about 90-135° C. Moreover, the need for cooling under pressure may be reduced or eliminated when these lower temperatures are utilized. The temperature operating window to fuse the sheets is wide allowing for various levels of consolidation to occur thus achieving either a more structural panel or one that would delaminate more with impact.

The knit layer groupings 200 and the woven layer groupings 300 may be consolidated individually and then the layer groupings 200, 300 may be adhesively bonded to one another through additional adhesive layers 400, or all of the layers 201, 301, 400 may be stacked and consolidated at the same time. One possible method of consolidation involves applying heat and pressure are simultaneously applied to the sample thorough a pair of platens. In other embodiments where the adhesive layer is activated in a method other than heat (such as UV curing), the layers are held together while the adhesive is activated to form the consolidated layer grouping. Other known consolidation techniques that involve heat and pressure, which include, but not limited to, laminating and autoclave.

While this specification is directed towards the use of the insole 100 as an insole 100 in a footwear article 10, the consolidated layers (insole 100) may be used for any other suitable purpose where a flexible puncture resistant textile is needed, for example as a vest, automobile component, or head protection.

EXAMPLES

Various embodiments of the invention are shown by way of the Examples below, but the scope of the invention is not limited by the specific Examples provided herein.

Layer Materials

A woven KEVLAR® fabric HEXCEL STYLE 726® available from Hexcel Corporation located in Anderson, S.C., was obtained. The Kevlar fabric (Hexcel Style 726) was comprised of KEVLAR 129® 840 denier warp and fill yarns woven together in a plain weave construction with 26 ends/inch and 26 picks/inch. The KEVLAR 129® fiber has a tensile strength of approximately 27 grams per denier (g/d) and an initial tensile modulus of approximately 755 g/d. The fabric weighed 6.0 oz/yd$^2$. The woven layer (uncoated) will be designated as "W" in the following examples.

The coated woven layer was prepared by coating the KEVLAR® fabric in a bath comprising:

a) approximately 200 grams (or 20%) of CAB-O-SPERSE PG003®, a fumed alumina dispersion (40% solids) with 150 nm particle size available from Cabot Corporation, b) 20 grams (or 2%) MILLITEX RESIN MRX®, a blocked isocyanate based cross-linking agent (35-45% by wt. solids) available from Milliken Chemical, and c) approximately 780 grams of water The solution was applied using a padding process (dip and squeeze at a roll pressure of 40 psi). The fabric was then dried at 320° F. The dry weight add-on of the chemical on the fabric was approximately 3%. The coated woven layer will be designated as "CW" in the following examples.

A polyester snake chap fabric s/9831301-001 available from Milliken & Company located in Spartanburg, S.C., was obtained. The polyester snake chap fabric was a Rashel knit (warp knit) fabric and contained polyester yarns. The fabric weighed 10.3 oz/yd$^2$. The knit layer (uncoated) will be designated as "K" in the following examples.

The coated knit layer was prepared by coating the polyester snake chap fabric in a bath comprising:

a) approximately 200 grams (or 20%) of CAB-O-SPERSE PG003®, a fumed alumina dispersion (40% solids) with 150 nm particle size available from Cabot Corporation, b) 20 grams (or 2%) MILLITEX RESIN MRX®, a blocked isocyanate based cross-linking agent (35-45% by wt. solids) available from Milliken Chemical, and c) approximately 780 grams of water The solution was applied using a padding process (dip and squeeze at a roll pressure of 40 psi). The fabric was then dried at 320° F. The dry weight add-on of the chemical on the fabric was approximately 3%. The coated knit layer will be designated as "CK" in the following examples.

The adhesive layer used was a web VI 6010-060-039® available from SPUNFAB® of Cuyahoga Falls, Ohio. VI 6010-060-039® is a hot melt type of adhesive web made of polyester, polyamide and a third proprietary polymer. It has a areal density of approximately 0.6 oz/yard$^2$. The melting point of the adhesive web is between 280° F. and 300° F. The adhesive layer was designated as "A" in the following examples.

Example 1

Layers were stacked according to the order below:
K-A-K-A-K-A-W-A-W-A-K-A-K-A-W-A-W-A-K-A-K-A-K As one can see from the layer listing, there were five layer groupings, in order: a knit layer grouping containing 3 knit layers, a woven layer grouping containing 2 woven layers, a knit layer grouping containing 2 knit layers, a woven layer grouping containing 2 woven layers, and a knit layer grouping containing 3 knit layers. The knit layer groups formed the upper and lower surfaces of the stack. An adhesive layer was located between each adjacent fabric layer. None of the woven or knit layers were coated with the particle coating.

Example 2

Layers were stacked according to the order below:
K-A-K-A-K-A-CW-A-CW-A-K-A-K-A-CW-A-CW-A-K-A-K-A-K As one can see from the layer listing, there were five layer groupings, in order: a knit layer grouping containing 3 knit layers, a woven layer grouping containing 2 woven layers, a knit layer grouping containing 2 knit layers, a woven layer grouping containing 2 woven layers, and a knit layer grouping containing 3 knit layers. The knit layer groups formed the upper and lower surfaces of the stack. An adhesive layer was located between each adjacent fabric layer. The woven layers were coated with the particle coating.

Example 3

Layers were stacked according to the order below:
CK-A-CK-A-CK-A-CW-A-CW-A-CK-A-CK-A-CW-A-CW-A-CK-A-CK-A-CK As one can see from the layer listing, there were five layer groupings, in order: a knit layer grouping containing 3 knit layers, a woven layer grouping containing 2 woven layers, a knit layer grouping containing 2 knit layers, a woven layer grouping containing 2 woven layers, and a knit layer grouping containing 3 knit layers. The knit layer groups formed the upper and lower surfaces of the stack. An adhesive layer was located between each adjacent fabric layer. The woven layers and the knit layers were coated with the particle coating.

Example 4

Layers were stacked according to the order below:
K-A-K-A-K-A-K-A-W-A-W-A-W-A-W-A-K-A-K-A-K-A-K As one can see from the layer listing, there were three layer groupings, in order: a knit layer grouping containing 4 knit layers, a woven layer grouping containing 4 woven layers, and a knit layer grouping containing 4 knit layers. The knit layer groups formed the upper and lower surfaces of the stack. An adhesive layer was located between each adjacent fabric layer. None of the woven or knit layers were coated with the particle coating.

Example 5

Layers were stacked according to the order below:
K-A-K-A-K-A-K-A-CW-A-CW-A-CW-A-CW-A-K-A-K-A-K-A-K As one can see from the layer listing, there were three layer groupings, in order: a knit layer grouping containing 4 knit layers, a woven layer grouping containing 4 woven layers, and a knit layer grouping containing 4 knit layers. The knit layer groups formed the upper and lower surfaces of the stack. An adhesive layer was located between each adjacent fabric layer. The woven layers were coated with the particle coating.

Example 6

Layers were stacked according to the order below:
CK-A-CK-A-CK-A-CK-A-CW-A-CW-A-CW-A-CW-A-CK-A-CK-A-CK-A-CK As one can see from the layer listing, there were three layer groupings, in order: a knit layer grouping containing 4 knit layers, a woven layer grouping containing 4 woven layers, and a knit layer grouping containing 4 knit layers. The knit layer groups formed the upper and lower surfaces of the stack. An adhesive layer was located between each adjacent fabric layer. The woven layers and the knit layers were coated with the particle coating.

Example 7

Layers were stacked according to the order below:
CW-A-CW-A-CW-A-CW-A-CW-A-CW-A-CW-A-CW-A-CW As one can see from the layer listing, there was one woven layer 4 knit containing 9 woven layers. The woven layers formed the upper and lower surfaces of the stack. An adhesive layer was located between each adjacent fabric layer. The woven layers were coated with the particle coating.

Each of the examples were tested using to the puncture resistant test was performed according to ASTM F2412-05 (section 11 puncture resistant footwear). The pass/fail criteria were set to 270 lbs force.

TABLE 1

Puncture resistance test results

| Example | Pass/Fail | Max. force @ failure (lbs) |
|---|---|---|
| 1 | Fail | 226 |
| 2 | Pass | N/A |
| 3 | Pass | 390 |
| 4 | Fail | 230 |
| 5 | Fail | 250 |
| 6 | Pass | 380 |

As one can see from the Table above, when the layers (knit and woven) were coated with the particle coating, the Examples passed the puncture resistance test.

TABLE 2

Modulus results

| Example | Bending modulus in ksi |
|---|---|
| 3 | 25.0 |
| 6 | 34.5 |
| 7 | 153.7 |

Comparing Example 7 using all woven layers with the other coated Examples (3 and 6), Example 7 was found to be much too stiff for an application such as an insole for footwear, where the insole was subjected to bending as the wearer walked. Whereas Examples 3 and 6 had adequate flexibility for use in footwear.

Examples 3 and 6 were subjected to thermal ageing (both hot ageing at 60° C. for 4 hours and cold ageing at −40° C. for 4 hours). The puncture resistance performance of Examples 3 and 6 were not compromised by the ageing testing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A safety footwear article comprising an insole with puncture-resistant properties, wherein the insole has an upper and lower surface, wherein the insole comprises a repeating pattern of knit layer groupings and woven layer groupings such that the knit layer groupings form both the upper and lower surfaces of the insole, wherein each layer within the knit layer groupings and each layer within the woven layer groupings is adhesively bonded to the adjacent layers within the insole, wherein the knit layer groupings comprise at least two knit layers, wherein each knit layer comprises yarns or fibers having a tenacity of about 5 or more grams per denier in a knit configuration and is impregnated on both sides and at least some of the internal surfaces with about 10 wt. % or less, based on the total weight of the knit layer, of a coating comprising a plurality of particles having a diameter of about 20 μm or less; and, wherein the woven layer groupings comprise at least two woven layers, wherein each woven layer comprises yarns or fibers having a tenacity of about 5 or more grams per denier in a woven configuration and is impregnated on both sides and at least some of the internal surfaces with about 10 wt. % or less, based on the total weight of the knit layer, of a coating comprising a plurality of particles having a diameter of about 20 μm or less.

2. The safety footwear article of claim 1, wherein the fiber or yarns of the woven layers comprise aramid fibers.

3. The safety footwear article of claim 1, wherein the fiber or yarns of the woven layers and the fiber or yarns of the knit layers comprise fibers or yarns having a tenacity of about 8 or more grams per denier.

4. The safety footwear article of claim 1, wherein the particles in both the knit layers and the woven layers are selected from the group consisting of fumed alumina and fumed silica.

5. The safety footwear article of claim 1, wherein the fiber or yarns of the knit layers comprise aramid fibers.

6. The safety footwear article of claim 1, wherein the fiber or yarns of the knit layers comprise polyester fibers.

7. The safety footwear article of claim 1, wherein each layer within the knit layer groupings and woven layer groupings is adhesively bonded to the adjacent layers with an adhesive.

8. The safety footwear article of claim 1, wherein the insole comprises 2 woven layer groupings and 3 knit layer groupings.

\* \* \* \* \*